(12) United States Patent
Reichel

(10) Patent No.: US 12,337,853 B2
(45) Date of Patent: Jun. 24, 2025

(54) METHOD AND SYSTEM FOR MULTI-ZONE PERSONALIZATION

(71) Applicant: Dr. Ing. h.c. F. Porsche Aktiengesellschaft, Stuttgart (DE)

(72) Inventor: Christopher Reichel, Benningen am Neckar (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 241 days.

(21) Appl. No.: 17/747,087

(22) Filed: May 18, 2022

(65) Prior Publication Data
US 2022/0396275 A1 Dec. 15, 2022

(30) Foreign Application Priority Data
Jun. 10, 2021 (DE) ...................... 10 2021 114 926.6

(51) Int. Cl.
*B60R 25/24* (2013.01)
*B60R 16/037* (2006.01)
(Continued)

(52) U.S. Cl.
CPC ......... *B60W 50/0098* (2013.01); *B60R 25/24* (2013.01); *B60W 40/08* (2013.01);
(Continued)

(58) Field of Classification Search
CPC ............. B60W 50/0098; B60W 40/08; B60W 2050/0088; B60W 2540/043; B60R 25/24; B60R 16/037; G07C 9/00309; G07C 2009/00769; G07C 2209/64; G07C 2009/00793
See application file for complete search history.

(56) References Cited

U.S. PATENT DOCUMENTS 9,707,911 B1 * 7/2017 Myers ................... B60R 16/037
10,730,481 B2 8/2020 Burgkhardt et al.
(Continued)

FOREIGN PATENT DOCUMENTS

DE 102014224481 A1 6/2016
WO 2013133791 A1 9/2013

*Primary Examiner* — Faris S Almatrahi
*Assistant Examiner* — Dana F Artimez
(74) *Attorney, Agent, or Firm* — Buchanan Ingersoll & Rooney PC

(57) ABSTRACT

A method for adjusting apparatuses of a vehicle including multiple zones having adjustable apparatuses in the vehicle interior. A setting of the apparatuses that is individually customized to a respective person is stored in a respective user account associated with a mobile terminal of the respective person. The respective setting is controlled by way of a control unit in accordance with the respective user account. Each zone is assigned a vehicle exterior area that is monitored by a vehicle authorization unit. The vehicle authorization unit authenticates the respective person, on the person's coming into the vehicle exterior area of the respective zone, by way of the mobile terminal in his possession, and provides the control unit with the associated user account. The control unit responds to a first person's coming into the exterior area of the respective zone by adjusting the apparatuses of the respective zone in the vehicle interior.

18 Claims, 4 Drawing Sheets

(51) Int. Cl.
  *B60W 40/08*   (2012.01)
  *B60W 50/00*   (2006.01)
  *G07C 9/00*    (2020.01)

(52) U.S. Cl.
  CPC . *G07C 9/00309* (2013.01); *B60W 2050/0088* (2013.01); *B60W 2540/043* (2020.02); *G07C 2009/00769* (2013.01); *G07C 2209/64* (2013.01)

(56) References Cited

U.S. PATENT DOCUMENTS

| | | | |
|---|---|---|---|
| 11,801,730 B1* | 10/2023 | Vader | G06Q 50/40 |
| 2010/0194691 A1* | 8/2010 | Kuenzner | G06F 3/0238 |
| | | | 345/172 |
| 2011/0166747 A1* | 7/2011 | Wijaya | B60H 1/00742 |
| | | | 165/203 |
| 2015/0149042 A1* | 5/2015 | Cooper | B60R 25/245 |
| | | | 701/48 |
| 2017/0116804 A1* | 4/2017 | Bae | G07C 9/25 |
| 2018/0148007 A1 | 5/2018 | Gage et al. | |
| 2018/0208208 A1* | 7/2018 | Chen | B60R 16/037 |
| 2019/0034857 A1* | 1/2019 | Ferguson | G05D 1/0231 |
| 2020/0353882 A1* | 11/2020 | Beiser | G06Q 20/363 |
| 2022/0016999 A1* | 1/2022 | Burk | B60N 2/0273 |

\* cited by examiner

METHOD AND SYSTEM FOR MULTI-ZONE PERSONALIZATION

CROSS-REFERENCE TO RELATED APPLICATION

This application claims priority to German Patent Application No. 10 2021 114 926.6, filed Jun. 10, 2021, the content of such application being incorporated by reference herein in its entirety.

FIELD OF THE INVENTION

The present invention relates to a method for multizone personalization so that different persons find individually adjusted apparatuses in a vehicle when getting into the vehicle. Furthermore, a system that allows the method to be performed is claimed.

BACKGROUND OF THE INVENTION

Today, a driver in a vehicle, for example when putting said vehicle into operation for the first time, stores information in a file for a respective individual setting for personalizable functions, such as seat settings or rearview mirror alignment, using an entry device of the driver that is identified by a vehicle authorization unit and used for this process. When the driver enters the vehicle again, this information is then read and the individual settings are made as appropriate. However, this resultant performed personalization in the vehicle is a purely driver-related personalization, or one relating to a single person. Only when the driver enters, for example by unlocking the vehicle or opening the driver's door, does a vehicle reaction automatically take place in the form of the individual settings for the respective personalizable functions. If further persons with authorized or known entry devices subsequently approach the vehicle, no such vehicle reaction takes place when they enter at a different vehicle door. Persons approaching the vehicle would be perfectly well identifiable by sensors of the vehicle authorization unit in this case if they each carried a personalized mobile entry key, for example, as an entry device.

DE 10 2014 224 481 A1, which is incorporated by reference herein, discloses a control system for a motor vehicle, wherein the control system can be connected to a mobile terminal. When the mobile terminal approaches the motor vehicle, predetermined functionalities of the motor vehicle, such as for example unlocking of the doors or starting of the engine, are triggered.

US 2018/0148007 A1, which is incorporated by reference herein, discloses a motor vehicle having an interior that is divided into multiple zones. A fingerprint sensor or a face recognition sensor is used to identify a person in a specific zone, whereupon multiple apparatuses associated with the zone are adjusted in person-related fashion.

WO 2013/133791 A1, which is incorporated by reference herein, describes a system for identifying an occupant of a motor vehicle, wherein a person is detected by way of sensors and the detected person is compared against a database. Based on the comparison, operation of the motor vehicle is permitted or not permitted.

SUMMARY OF THE INVENTION

Against this background, described herein is a method for multizone personalization, wherein respective individual settings are made in a vehicle for different persons entering the vehicle. Moreover, the aim is to provide a system that allows the method to be performed.

A method for adjusting apparatuses of a vehicle, wherein the vehicle comprises multiple zones, each having at least one adjustable apparatus, in the vehicle interior. A setting of the at least one apparatus that is individually customized to a respective person is stored in a respective user account associated with a mobile terminal of the respective person. The respective setting of the at least one apparatus in a respective zone is controlled by way of a control unit in accordance with the respective user account. Each zone is assigned a vehicle exterior area that is adjacent to the respective zone and is monitored by a vehicle authorization unit. The respective person, on coming into the vehicle exterior area of the respective zone, is authenticated to the vehicle authorization unit by way of the mobile terminal in his possession. The vehicle authorization unit provides the control unit with the user account associated with the respective mobile terminal for this respective zone. The control unit responds to a first person's coming into the vehicle exterior area of the respective zone by adjusting the at least one apparatus of the respective zone in the vehicle interior in accordance with the user account associated with the mobile terminal of the first person, and the first person gains entry to this respective zone. This setting is passed on to the respective setting of the at least one apparatus in all other zones. When a respective further person comes into the vehicle exterior area of a respective other zone of the vehicle with the mobile terminal that authenticates the respective further person, the setting of the at least one apparatus that is stored in the user account associated with this mobile terminal is implemented in this respective other zone.

The term "passed on" means that the respective setting of the at least one apparatus is transferred to the setting of another at least one apparatus, that is to say that the latter adjusts itself accordingly. The respective individually customized setting is made for example when the vehicle is put into operation for the first time by its owner and for example the family of said owner as further persons.

In one embodiment of the method according to aspects of the invention, the mobile terminal is chosen from the following list: smartphone, radio key, radio entry card, wearable, such as for example smart watch. In general, all embodiments of a so-called mobile device key (mobile entry device or mobile entry key that transmits an electromagnetic signal) are conceivable, provided that they are identifiable by the vehicle authorization unit or by the sensors monitoring the vehicle exterior area. This monitoring is performed dynamically in the vehicle exterior area, i.e. the vehicle authorization unit and the sensors monitoring the vehicle exterior area are continually active both in a near field, for example by way of Bluetooth, and in a far field, for example by way of WLAN, of vehicle surroundings. It is also possible to identify a distance of the mobile terminal from the vehicle, or even to associate a position of the mobile terminal with a vehicle exterior area that is adjacent to a respective zone, and to detect an occurrence of a further mobile terminal.

The vehicle interior is split into zones for example in accordance with a seating option for a vehicle occupant. In the case of a vehicle for four persons, there is for example a respective seating option on an anterior driver's side (DS for short) and an anterior front-seat passenger's side (FS), and also on a posterior driver's side (PDS) and a posterior front-seat passenger's side (PFS). In the main, the individual seating options are provided with multiple individually adjustable apparatuses, at least some of the individually adjustable apparatuses associated with the individual seating options being the same for multiple or all of the seating options. As such, there is for example an individually adjustable seat for each of the seating options.

In a further embodiment of the method according to aspects of the invention, the at least one individually adjustable apparatus is chosen from the following list: seat, air conditioning, fragrancing, loudspeaker, interior lighting, entertainment system (in particular audio and/or video).

The respective individually customized setting may also relate to a respective object rather than to a person. The respective object may be for example an animal cage, a beer crate, a suitcase, a removal crate or a comparable item. There is a particularly advantageous setting for the respective object, for example a vertical backrest and/or an upper belt point taken to the lowest position and/or air conditioning set to cooling (for example in the case of a box containing groceries), which are particularly suitable for transport in the vehicle. By way of example, an individual mobile terminal fixed to the respective object and identifying it, for example an RFID tag, is provided for the respective object. Said mobile terminal is authenticated, for example once in an initialization step by a driver, to the control unit in the vehicle that controls the respective setting.

In yet a further embodiment of the method according to aspects of the invention, the first person, after entering the vehicle, activates or deactivates a respective user account of a respective further person. In the same way, it is conceivable for the first person, after entering the vehicle, to activate or deactivate detection of a respective vehicle exterior area's being approached or come into by the mobile terminal of a further person. It is also conceivable for an individual setting of the at least one apparatus not to be able to be changed in a user account predefined by the first person, for example. As such, it is possible for example for a volume of a loudspeaker that is not situated in the zone of the anterior driver's side to be limited to a maximum value or to be parameterizable only by the first person.

In yet a further continued embodiment of the method according to aspects of the invention, an anticipatory vehicle preparation involves stipulating, in a file that is accessible to the control unit or retrievable by the control unit, on the basis of the first person, who has gained entry to a zone, which user account of a further person is used to adjust the at least one apparatus in another zone, specifically even before the further person approaches with his mobile terminal. The setting for the further person stipulated in the file is thus made automatically directly after the first person has entered. This advantageously ensures that a further person who is known to the first person in advance the setting have already been made in accordance with his user account before the further person enters the vehicle. This is done even without the further person currently being in possession of his mobile terminal.

Furthermore, a system for adjusting apparatuses of a vehicle comprises a vehicle, a control unit, multiple proximity sensors, multiple mobile terminals, each associated with a respective person, a vehicle authorization unit and multiple zones, each having at least one adjustable apparatus, in a vehicle interior. A setting of the at least one apparatus that is individually customized to a respective person is stored in a respective user account associated with the mobile terminal of the respective person. The control unit is configured to control the respective setting of the at least one apparatus in the respective zone in accordance with the respective user account. Each zone is assigned a vehicle exterior area that is adjacent to the respective zone and is monitored by the vehicle authorization unit by means of the proximity sensors. The vehicle authorization unit is configured to authenticate the respective person, on said person's coming into the vehicle exterior area of the respective zone, by way of the mobile terminal in his possession, and to provide the control unit with the user account associated with the respective mobile terminal for the respective zone. The control unit is configured to respond to a first person's coming into the vehicle exterior area of the respective zone by adjusting the at least one apparatus of the respective zone in the vehicle interior in accordance with the user account associated with the mobile terminal of the first person, passing on this setting to the setting of the at least one apparatus in all other zones, and, when a respective further person comes into the vehicle exterior area of a respective other zone of the vehicle with the mobile terminal that authenticates the respective further person, implementing the setting of the at least one apparatus that is stored in the user account associated with this mobile terminal of the further person in this respective other zone.

The user account associated with the mobile terminal of the respective person may be stored for example in a storage unit that is accessible to the control unit, wherein the storage unit may be situated locally in the vehicle or is provided by a cloud that is in contact with a central server.

In one configuration of the system according to aspects of the invention, the mobile terminal is chosen from the following list: smartphone, radio key, radio entry card, wearable.

In a further configuration of the system according to aspects of the invention, the at least one individually adjustable apparatus is chosen from the following list: seat, air conditioning, fragrancing, loudspeaker, interior lighting, entertainment system (in particular audio and/or video).

In yet a further configuration of the system according to aspects of the invention, the first person, after entering the vehicle, activates or deactivates a respective user account of a respective further person.

In yet a further continued configuration of the system according to aspects of the invention, an anticipatory vehicle preparation involves stipulating, in a file that is accessible to the control unit or retrievable by the control unit, on the basis of the first person, who has gained entry to the first zone, which user account of a further person is used to adjust the at least one apparatus in another zone, specifically even before the further person approaches with his mobile terminal, the control unit being configured to make the adjustment in accordance with the file.

Furthermore, a computer program product having a computer-readable medium that stores a program code that is executable on at least one computing unit of a vehicle is provided, wherein the program code, on execution on the at least one computing unit, causes the at least one computing unit to perform at least one of the following steps:

storing a setting of at least one apparatus that is individually customized to a respective person in a respective user account associated with a mobile terminal of the respective person, wherein the respective user account is retrievable from a storage unit that is communicatively connected to the at least one computing unit and wherein the at least one apparatus is arranged in a respective zone of a vehicle interior area that is split into multiple zones, monitoring a respective vehicle exterior area that is adjacent to the respective zone by means of proximity sensors, receiving authentication data of the mobile terminal associated with a respective person when the respective person comes into the respective vehicle exterior area that is adjacent to the respective zone, authenticating the authentication data on the basis of the respective user account associated with the respective mobile terminal, adjusting at least one apparatus in the respective zone in accordance with the respective user account, passing on the setting in accordance with the user account of a first person to the respective setting of the at least one apparatus in all other zones after said person has entered a first zone, and, when a respective further person comes into the vehicle exterior area of a respective other zone of the vehicle with the mobile terminal that authenticates the respective further person, implementing the setting of the at least one apparatus that is stored in the user account associated with this mobile terminal of the further person in this respective other zone.

The computer program according to aspects of the invention or the program code according to aspects of the invention is in particular designed to perform a method according to aspects of the invention.

The computer program according to aspects of the invention or the program code according to aspects of the invention is also executable on distributed computing units, such as for example a control unit and/or a vehicle authorization unit, in particular on the control unit and/or the vehicle authorization unit as components of the system according to aspects of the invention.

Further advantages and configurations of the invention become apparent from the description and the accompanying drawing.

It is self-evident that the features cited above and those yet to be explained below can be used not only in the respective indicated combination but also in other combinations or on their own without departing from the scope of the present invention.

BRIEF DESCRIPTION OF THE DRAWINGS

The figures are described coherently and comprehensively; identical reference signs are assigned to identical components.

DETAILED DESCRIPTION OF THE INVENTION

Figure 1:
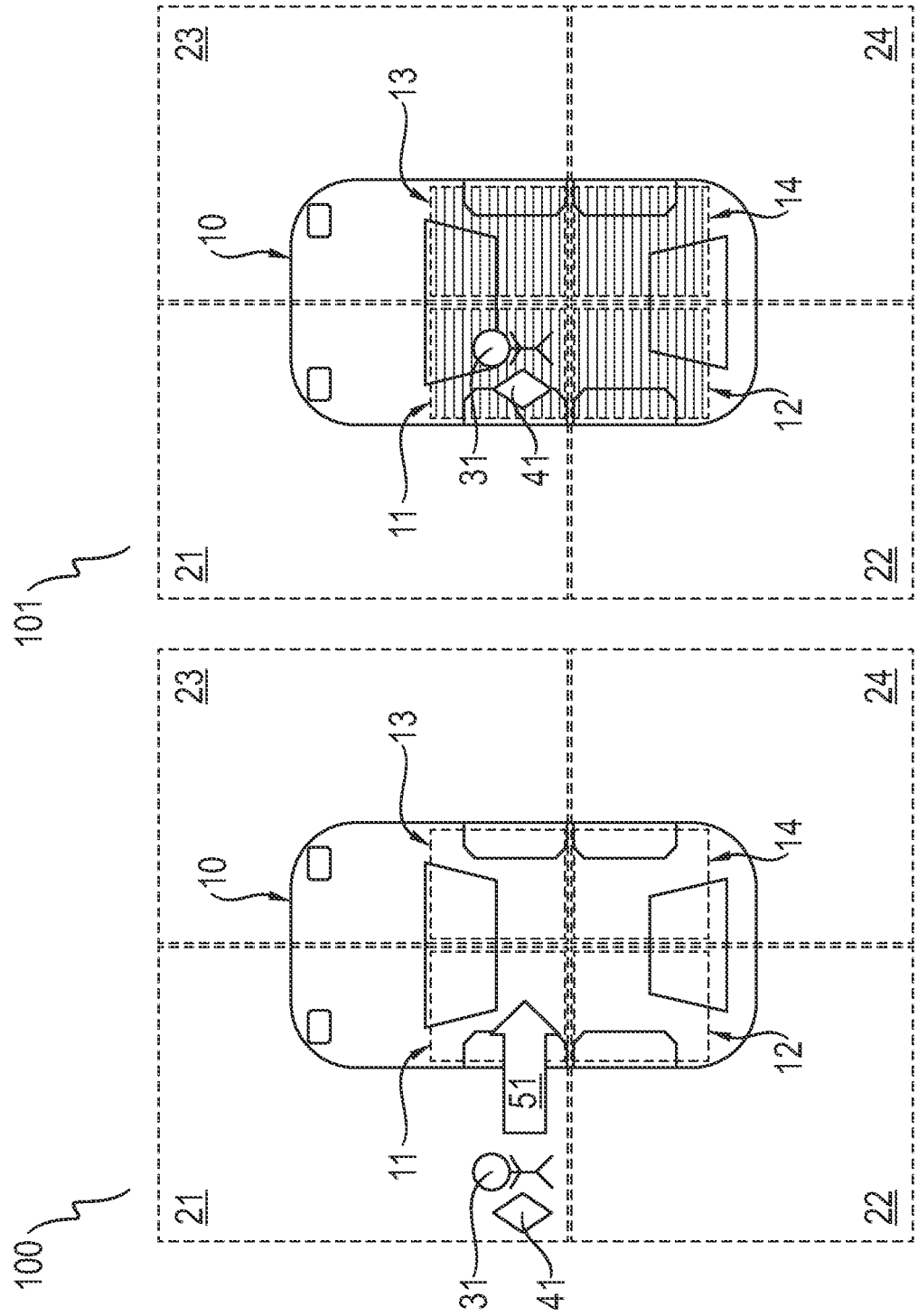
FIG. 1 schematically shows a first person entering a vehicle in an embodiment of the method according to aspects of the invention.

FIG. 1 schematically shows a first person 31 entering a vehicle 10 in an embodiment of the method according to aspects of the invention. A vehicle 10 comprises a total of four zones 11, 12, 13, 14 in an interior, including an anterior driver's side (DS) as the first zone 11, a posterior driver's side (PDS) as the second zone 12, an anterior front-seat passenger's side (FS) as the third zone 13 and a posterior front-seat passenger's side (PFS) as the fourth zone 14. In the vehicle surroundings, four vehicle exterior areas 21, 22, 23, 24 are adjacent to the respective zones 11, 12, 13, 14. Each of the four zones 11, 12, 13, 14 comprises at least one respective adjustable apparatus, for example air conditioning controlled by means of a control unit (not shown) and considered by way of illustration below. A vehicle authorization unit (not shown) has respective user accounts available for, by way of example, four persons, said user accounts containing settings, made or defined by the respective persons, for an air conditioning (for example temperature, fan strength, etc.) that said persons prefer. In illustration 100, the first person 31 comes into the first vehicle exterior area 21. The person 31 is authenticated by the vehicle authorization unit by way of a mobile terminal 41 associated with said person, which is a radio key, for example, said vehicle authorization unit providing the control unit with a user account associated with the person 31, or with his mobile terminal 41, and notifying the control unit that entry 51 is taking place in the first zone 11 of the vehicle interior. The control unit thus adjusts the at least one apparatus in this first zone 11 in accordance with the user account associated with the mobile terminal 41. In illustration 101, the first person 31 is in the first zone 11 and the setting from zone 11 has been passed on to all further zones 12, 13, 14, i.e. the at least one apparatus situated in each of these further zones 12, 13, 14, here the air conditioning, has been provided with the setting in the same way as the at least one apparatus in the first zone 11 (horizontal hatching in all zones 11, 12, 13, 14). The process shown is consistent with a use case in which a chauffeur puts a service vehicle into operation, for example.

Figure 2:
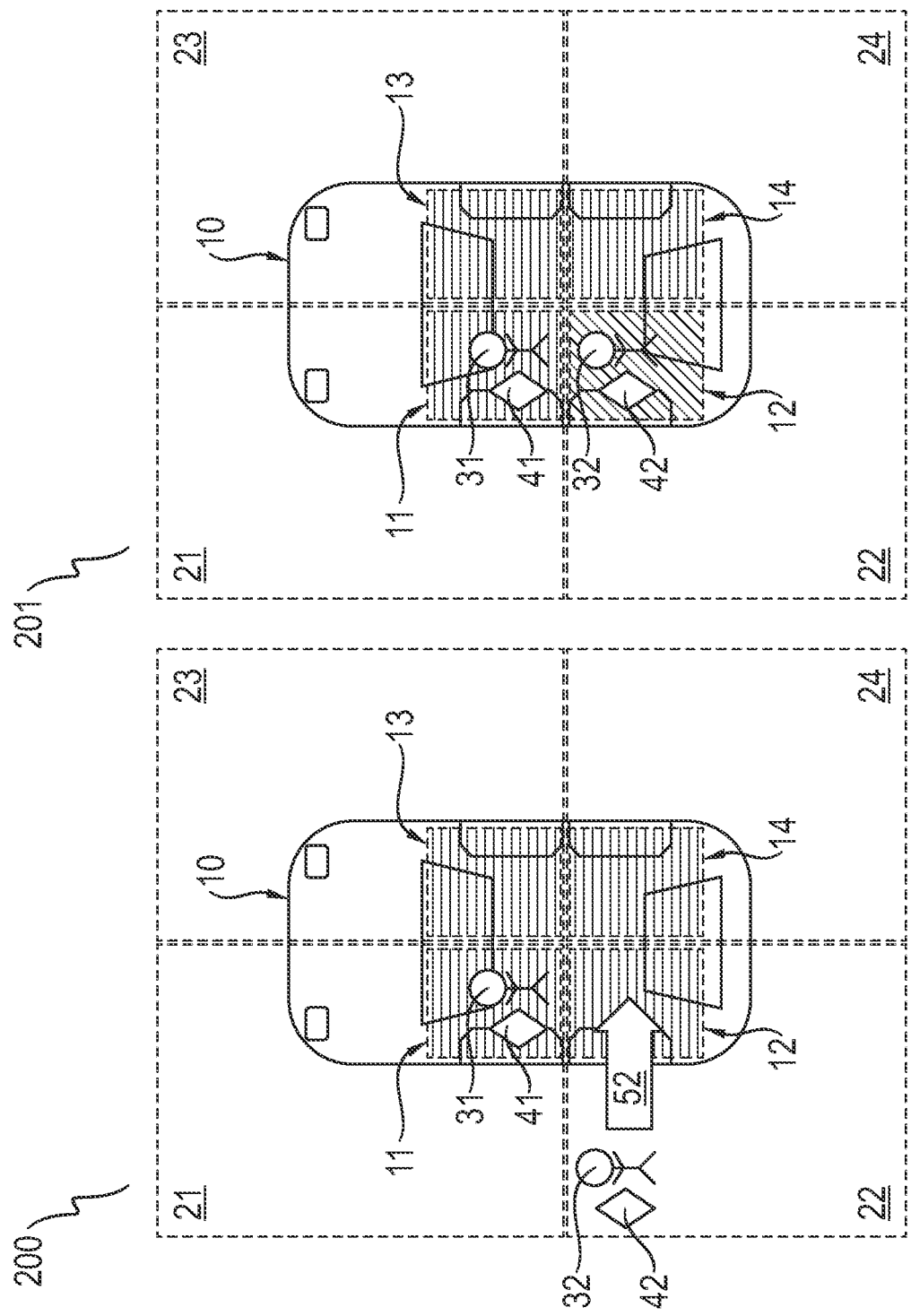
FIG. 2 schematically shows a second person entering the vehicle in the embodiment of the method according to aspects of the invention.

FIG. 2 schematically shows a second person 32 entering the vehicle 10 in the embodiment of the method according to aspects of the invention. In this case, the second person 32 comes into the second vehicle exterior area 22 in illustration 200. The person 32 is authenticated by the vehicle authorization unit by way of a mobile terminal 42 associated with said person, said vehicle authorization unit providing the control unit with a user account associated with the person 32, or with his mobile terminal 42, and notifying the control unit that entry 52 is taking place in the second zone 12 of the vehicle interior. The control unit thus adjusts the at least one apparatus in this second zone 12 in accordance with the user account associated with the mobile terminal 42. In illustration 201, the second person 32 is in the second zone 12. However, the setting made in the second zone 12 is not passed on to unoccupied zones 13, 14 (only the second zone shows diagonal hatching, while all other zones 11, 13, 14 continue to have horizontal hatching). According to the use case begun in FIG. 1, the chauffeur (first person 31) has picked up his boss (second person 32), who sits behind him on the posterior driver's side (PDS).

Figure 3:
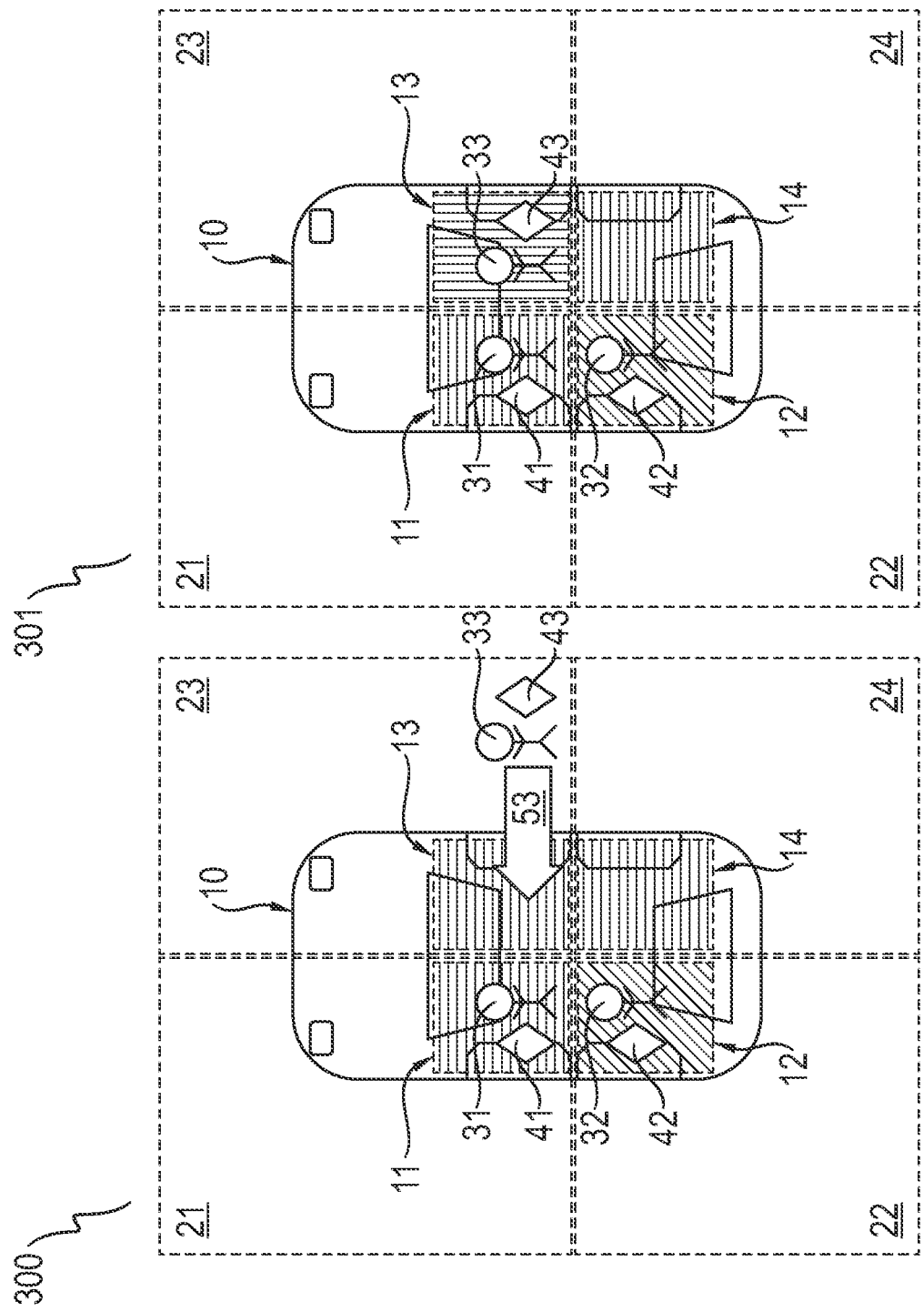
FIG. 3 schematically shows a third person entering the vehicle in the embodiment of the method according to aspects of the invention.

FIG. 3 schematically shows a third person 33 entering the vehicle 10 in the embodiment of the method according to aspects of the invention. In this case, the third person 33 comes into the third vehicle exterior area 23 in illustration 300. The person 33 is authenticated by the vehicle authorization unit by way of a mobile terminal 43 associated with said person, said vehicle authorization unit providing the control unit with a user account associated with the person 33, or with his mobile terminal 43, and notifying the control unit that entry 53 is taking place in the third zone 13 of the vehicle interior. In illustration 301, the third person 33 is in the third zone 13. The control unit has adjusted the at least one apparatus in this third zone 13 in accordance with the user account associated with the mobile terminal 43 (third zone 13 shows vertical hatching). According to the use case related in FIG. 1 and FIG. 2, the chauffeur (first person 31), after having picked up his boss (second person 32), has picked up a further passenger (third person 33), who sits beside him on the anterior front-seat passenger's side (FS).

Figure 4:
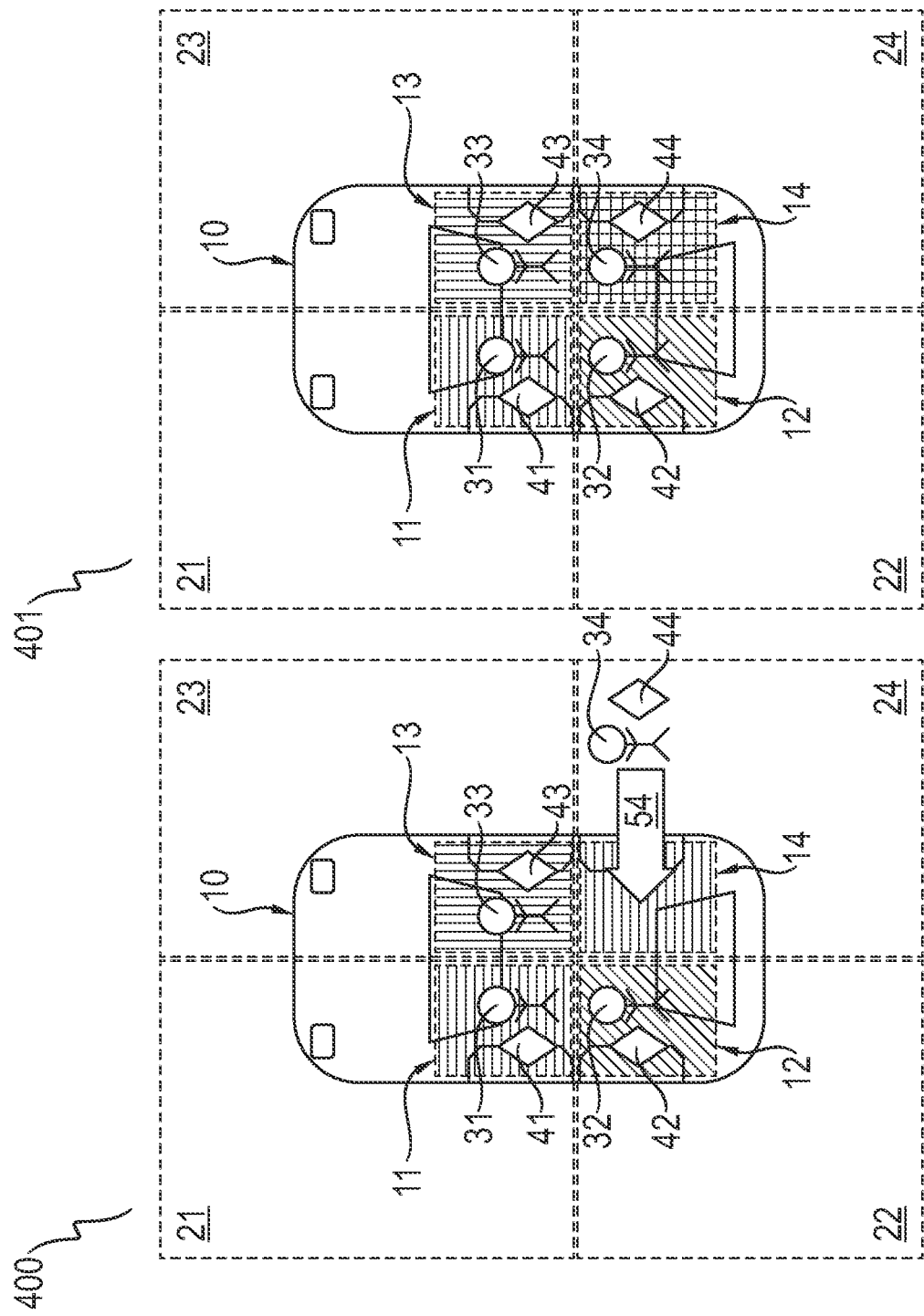
FIG. 4 schematically shows a fourth person entering the vehicle in the embodiment of the method according to aspects of the invention.

FIG. 4 schematically shows a fourth person 34 entering the vehicle 10 in the embodiment of the method according to aspects of the invention. In this case, the fourth person 34 comes into the fourth vehicle exterior area 24 in illustration 400. The person 34 is authenticated by the vehicle authorization unit by way of a mobile terminal 44 associated with said person, said vehicle authorization unit providing the control unit with a user account associated with the person 34, or with his mobile terminal 44, and notifying the control unit that entry 54 is taking place in the fourth zone 14 of the vehicle interior. In illustration 401, the fourth person 34 is in the fourth zone 14. The control unit has adjusted the at least one apparatus in this fourth zone 14 in accordance with the user account associated with the mobile terminal 44 (fourth zone 14 shows checked pattern). According to the use case related in FIGS. 1 to 3, the chauffeur (first person 31), after having picked up his boss (second person 32) and then a further passenger (third person 33), has finally received a last passenger (fourth person 34), who has taken a seat on the posterior front-seat passenger's side (PFS). There is thus now a respective individual setting for the air conditioning in each of the four zones 11, 12, 13, 14, depending on the passenger situated therein.

LIST OF REFERENCE SIGNS 10 vehicle
11 first zone (DS)
12 second zone (PDS)
13 third zone (FS)
14 fourth zone (PFS)
21 first vehicle exterior area
22 second vehicle exterior area
23 third vehicle exterior area
24 fourth vehicle exterior area
31 first person
32 second person
33 third person
34 fourth person
41 first mobile terminal
42 second mobile terminal
43 third mobile terminal
44 fourth mobile terminal
51 first entry
52 second entry
53 third entry
54 fourth entry
100 the first person coming into first vehicle exterior area
101 first person in first zone
200 the second person coming into second vehicle exterior area
201 second person in second zone
300 the third person coming into third vehicle exterior area
301 third person in third zone
400 the fourth person coming into fourth vehicle exterior area
401 fourth person in fourth zone

What is claimed is:

1. A method for adjusting apparatuses of a vehicle (10), wherein the vehicle (10) comprises multiple zones (11, 12, 13, 14), each having at least one adjustable apparatus, in a vehicle interior, the method comprising:
storing a setting of the at least one adjustable apparatus in a respective zone (11, 12, 13, 14) that is individually customized to a respective person (31, 32, 33, 34) in a respective user account associated with a mobile terminal (41, 42, 43, 44) of the respective person (31, 32, 33, 34),
controlling a respective setting of the at least one adjustable apparatus in a respective zone (11, 12, 13, 14) by way of a controller in accordance with the respective user account,
assigning to each zone (11, 12, 13, 14) a vehicle exterior area (21, 22, 23, 24) that is adjacent to the respective zone (11, 12, 13, 14),
monitoring the vehicle exterior area (21, 22, 23, 24) by a vehicle authorization unit,
authenticating the respective person (31, 32, 33, 34), on coming into the vehicle exterior area (21, 22, 23, 24) of the respective zone (11, 12, 13, 14), to the vehicle authorization unit by way of the mobile terminal (41, 42, 43, 44) in his possession,
providing, by the vehicle authorization unit, the controller with the user account associated with a respective mobile terminal (41, 42, 43, 44) for the respective zone (11, 12, 13, 14),
responding, by the controller, to a first person (31) coming into the vehicle exterior area (21) of the respective zone (11) by adjusting the at least one adjustable apparatus of the respective zone (11) in the vehicle interior in accordance with the user account associated with the mobile terminal (41) of the first person (31) after the first person (31) gains entry (51) to the respective zone (11),
transmitting a setting of the at least one adjustable apparatus by the first person (31) to the at least one adjustable apparatus in each of the other zones (12, 13, 14), which adjusts the respective setting of the at least one adjustable apparatus in each of the other zones (12, 13, 14) to be the same as the setting of the at least one adjustable apparatus by the first person (31),
activating, by the first person (31), a respective user account of a respective further person (32, 33, 34) in a respective other zone (12, 13, 14) of the vehicle (10), and
setting, by the first person (31), an allowable limit for a respective setting of the at least one adjustable apparatus for the respective user account of the respective further person (32, 33, 34) in the respective other zone (12, 13, 14) of the vehicle (10),
storing the respective setting and the allowable limit of the respective setting in the respective other zone (12, 13, 14), and
when the respective further person (32, 33, 34) comes into the vehicle exterior area (22, 23, 24) of the respective other zone (12, 13, 14) of the vehicle (10) with the mobile terminal (42, 43, 44) that authenticates the respective further person (32, 33, 34), implementing the respective setting and the allowable limit of the respective setting of the at least one adjustable apparatus that is stored in the user account associated with the mobile terminal (42, 43, 44) of the further person (32, 33, 34) in the respective other zone (12, 13, 14).

2. The method as claimed in claim 1, wherein the mobile terminal (41, 42, 43, 44) is a smartphone, a radio key, a radio entry card, or a wearable.

3. The method as claimed in claim 1, wherein the at least one adjustable apparatus is selected from the group consisting of a seat, air conditioning, fragrancing, loudspeaker, interior lighting, and an audio and/or video entertainment system.

4. The method as claimed in claim 1, wherein an anticipatory vehicle preparation involves stipulating, in a file that is retrievable by the controller, by the first person (31), who has gained entry (51) to the respective zone (11), which respective user account of the respective person (32, 33, 34) is used to adjust the at least one apparatus in the respective other zone (12, 13, 14), even before the respective further person (32, 33, 34) approaches with his mobile terminal (42, 43, 44), and making the adjustment in accordance with the file.

5. The method as claimed in claim 1, further comprising transmitting a setting of the at least one adjustable apparatus related to a respective object transported in the respective zone (11, 12, 13, 14).

6. The method as claimed in claim 5, the respective object transported in the respective zone (11, 12, 13, 14) is at least one of an animal cage, a beer crate, a box containing groceries, a suitcase, or a removal crate.

7. The method as claimed in claim 5, wherein the respective object transported in the respective zone (11, 12, 13, 14) is authenticated with an RFID tag attached to the respective object.

8. The method as claimed in claim 1, further comprising identifying a distance of the mobile terminal (41, 42, 43, 44) from the vehicle (10).

9. The method as claimed in claim 1, further comprising associating a position of the mobile terminal (41, 42, 43, 44) with the vehicle exterior area (21, 22, 23, 24) that is adjacent to a respective zone (11, 12, 13, 14).

10. The method as claimed in claim 1, wherein implementing the respective setting and the allowable limit of the respective setting of the at least one adjustable apparatus that is stored in the user account associated with the mobile terminal (42, 43, 44) of the further person (32, 33, 34) in the respective other zone is performed without transmitting the setting of the at least one adjustable apparatus of the further person (32, 33, 34) in the respective other zone (12, 13, 14) to any unoccupied zones (12, 13, 14).

11. The method as claimed in claim 1, wherein prior to the activating step, the method further comprises activating, by the first person (31), detection of the respective further person (32, 33, 34) in the respective other zone (12, 13, 14) of the vehicle (10).

12. The method as claimed in claim 11, wherein prior to the activating step, the method further comprises deactivating, by the first person (31), detection of another respective further person (33, 34) in another respective other zone (13, 14) of the vehicle (10).

13. A system for adjusting apparatuses of a vehicle (10), the system comprising:
the vehicle (10),
a controller,
multiple proximity sensors,
multiple mobile terminals (41, 42, 43, 44), each associated with a respective person (31, 32, 33, 34),
a vehicle authorization unit, and
multiple zones (11, 12, 13, 14), each having at least one adjustable apparatus, in a vehicle interior, wherein:
a setting of the at least one apparatus that is individually customized to a respective person (31, 32, 33, 34) is stored in a respective user account associated with the mobile terminal (41, 42, 43, 44) of the respective person (31, 32, 33, 34),
the controller is configured to control the respective setting of the at least one apparatus in the respective zone (11, 12, 13, 14) in accordance with the respective user account,
each zone (11, 12, 13, 14) is assigned a vehicle exterior area (21, 22, 23, 24) that is adjacent to the respective zone (11, 12, 13, 14), the vehicle exterior area (21, 22, 23, 24) being monitored by the vehicle authorization unit by way of the multiple proximity sensors,
the vehicle authorization unit is configured to authenticate the respective person (31, 32, 33, 34), on said person coming into the vehicle exterior area (21, 22, 23, 24) of the respective zone (11, 12, 13, 14), by way of the mobile terminal (41, 42, 43, 44) in his possession, and to provide the controller with the user account associated with a respective mobile terminal (41, 42, 43, 44) for the respective zone (11, 12, 13, 14),
the controller is configured to:
respond to a first person (31) coming into the vehicle exterior area (21) of the respective zone (11) by adjusting the at least one apparatus of the respective zone (11) in the vehicle interior in accordance with the user account associated with the mobile terminal (41) of the first person (31),
transmit a setting of the at least one adjustable apparatus by the first person (31) to the at least one adjustable apparatus in each of the other zones (12, 13, 14), which adjusts the respective setting of the at least one adjustable apparatus in each of the other zones (12, 13, 14), to be the same as the setting of the at least one adjustable apparatus by the first person (31), and,
activate, by the first person (31), a respective user account of a respective further person (32, 33, 34) in a respective other zone (12, 13, 14) of the vehicle (10), and
set, by the first person (31), an allowable limit for a respective setting of the at least one adjustable apparatus for the respective user account of the respective further person (32, 33, 34) in the respective other zone (12, 13, 14) of the vehicle (10),
store the respective setting and the allowable limit of the respective setting in the respective other zone (12, 13, 14),
when the respective further person (32, 33, 34) comes into the vehicle exterior area (22, 23, 24) of the respective other zone (12, 13, 14) of the vehicle (10) with the mobile terminal (42, 43, 44) that authenticates the respective further person (32, 33, 34), implement the respective setting and the allowable limit of the respective setting of the at least one adjustable apparatus that is stored in the user account associated with the mobile terminal (42, 43, 44) of the further person (32, 33, 34) in the respective other zone (12, 13, 14).

14. The system as claimed in claim 13, wherein the mobile terminal (41, 42, 43, 44) is a smartphone, a radio key, a radio entry card, or a wearable.

15. The system as claimed in claim 13, wherein the at least one adjustable apparatus is selected from the group consisting of a seat, air conditioning, fragrancing, loudspeaker, interior lighting, and an audio and/or video entertainment system.

16. The system as claimed in claim 13, wherein an anticipatory vehicle preparation involves stipulating, in a file that is retrievable by the controller, by the first person (31), who has gained entry (51) to a zone (11), which user account of a further person (12, 13, 14) is used to adjust the at least one apparatus in the respective other zone (12, 13, 14), even before the further person (32, 33, 34) approaches with his mobile terminal (42, 43, 44), the controller being configured to make the adjustment in accordance with the file.

17. The system as claimed in claim 16, wherein the user account of the further person (32, 33, 34) is used to adjust the at least one apparatus in the respective other zone (12, 13, 14), without the further person (32, 33, 34) being in possession of his mobile terminal (42, 43, 44).

18. A computer program product having a non-transitory computer-readable medium that stores a program code that is executable on at least one processor of a vehicle (10), wherein the program code, on execution on the at least one processor, causes the at least one processor to perform at least one of the following steps:

storing a setting of at least one apparatus that is individually customized to a respective person (31, 32, 33, 34) in a respective user account associated with a mobile terminal (41, 42, 43, 44) of the respective person (31, 32, 33, 34), wherein the respective user account is retrievable from a computer-readable storage medium that is communicatively connected to the at least one processor and wherein the at least one apparatus is arranged in a respective zone (11, 12, 13, 14) of a vehicle interior area that is split into multiple zones (11, 12, 13, 14), monitoring a respective vehicle exterior area (21, 22, 23, 24) that is adjacent to the respective zone (11, 12, 13, 14) by means of proximity sensors, receiving authentication data of the mobile terminal (41, 42, 43, 44) associated with a respective person (31, 32, 33, 34) when the respective person (31, 32, 33, 34) comes into the respective vehicle exterior area (21, 22, 23, 24) that is adjacent to the respective zone (11, 12, 13, 14), authenticating the authentication data on the basis of the respective user account associated with the respective mobile terminal (41, 42, 43, 44), adjusting the at least one apparatus in the respective zone (11, 12, 13, 14) in accordance with the respective user account, transmitting a setting of the at least one apparatus in accordance with the user account of a first person (31) to the at least one adjustable apparatus in each of the other zones (12, 13, 14), which adjusts the respective setting of the at least one apparatus in each of the other zones (12, 13, 14) after said person has entered a first zone (11), to be the same as the setting of the at least one apparatus by the first person (31), and, activating, by the first person (31), a respective user account of a respective further person (32, 33, 34) in a respective other zone (12, 13, 14) of the vehicle (10), and setting, by the first person (31), an allowable limit for a respective setting of the at least one adjustable apparatus for the respective user account of the respective further person (32, 33, 34) in the respective other zone (12, 13, 14) of the vehicle (10), storing the respective setting and the allowable limit of the respective setting in the respective other zone (12, 13, 14), when the respective further person (32, 33, 34) comes into the vehicle exterior area (22, 23, 24) of the respective other zone (12, 13, 14) of the vehicle (10) with the mobile terminal (42, 43, 44) that authenticates the respective further person (32, 33, 34), implementing the respective setting and the allowable limit of the respective setting of the at least one apparatus that is stored in the user account associated with the mobile terminal (42, 43, 44) of the further person (32, 33, 34) in the respective other zone (12, 13, 14).

\* \* \* \* \*